United States Patent
Hwang et al.

(10) Patent No.: US 8,103,840 B2
(45) Date of Patent: Jan. 24, 2012

(54) SNAPSHOT MECHANISM AND METHOD THEREOF

(75) Inventors: Wen-Shyang Hwang, Kaohsiung County (TW); Ching-Hung Lin, Kaohsiung County (TW); Jun-Yao Wang, Tainan (TW); Chin-Pei Su, Kaohsiung County (TW); Tsung-Lin Tsai, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 667 days.

(21) Appl. No.: 11/567,212

(22) Filed: Dec. 6, 2006

(65) Prior Publication Data
US 2007/0271431 A1 Nov. 22, 2007

(30) Foreign Application Priority Data
May 17, 2006 (TW) .............................. 95117415 A

(51) Int. Cl.
*G06F 12/00* (2006.01)
(52) U.S. Cl. ................. 711/162; 711/E12.103
(58) Field of Classification Search .......... None
See application file for complete search history.

(56) References Cited

U.S. PATENT DOCUMENTS

| | | | |
|---|---|---|---|
| 6,594,744 B1 | 7/2003 | Humlicek et al. | |
| 6,771,843 B1 | 8/2004 | Huber et al. | |
| 7,636,814 B1 * | 12/2009 | Karr et al. | 711/143 |
| 2002/0143764 A1 * | 10/2002 | Martin et al. | 707/8 |
| 2003/0159007 A1 * | 8/2003 | Sawdon et al. | 711/154 |
| 2005/0182797 A1 | 8/2005 | Adkins et al. | |
| 2006/0047925 A1 * | 3/2006 | Perry | 711/162 |
| 2006/0047999 A1 * | 3/2006 | Passerini et al. | 714/6 |

* cited by examiner

*Primary Examiner* — Reginald Bragdon
*Assistant Examiner* — Aracelis Ruiz
(74) *Attorney, Agent, or Firm* — Jianq Chyun IP Office

(57) ABSTRACT

A snapshot mechanism and a method thereof used in a data processing system are provided to backup snapshot data. The snapshot mechanism includes a snapshot storage unit and a buffer storage unit, wherein the snapshot storage unit is used as a unit for storing data generated after a target storage unit snapshots data and accordingly generating a plurality of snapshot management data. In addition, the buffer storage unit temporarily stores new data and flushes the data to the target storage unit in predetermined time interval. According to the snapshot management data, the target storage unit can be rolled back or rolled forward to the status before a predetermined time.

20 Claims, 12 Drawing Sheets

Relation Pair Table (RPT)

| Source address | Target Volume Uuid | Destination address | Snapshot Volume Uuid | Pair ID |
|---|---|---|---|---|
| IPv4 or IPv6 | $T_1$ | IPv4 or IPv6 | $S_1$ | $P_1$ |
| IPv4 or IPv6 | $T_2$ | IPv4 or IPv6 | $S_2$ | $P_2$ |
| IPv4 or IPv6 | ---- | IPv4 or IPv6 | ---- | ---- |
| IPv4 or IPv6 | $T_n$ | IPv4 or IPv6 | $S_n$ | $P_n$ |

FIG. 4B

Snapshot Management Table (SMT)

| P.I. | #th Snapshot | Create Point-in-time | I.K. |
|---|---|---|---|
| 1 | 1 | 2005/03/10 17:00:00 | 1 |
| 1 | 2 | 2005/03/11 17:00:00 | 2 |
| 2 | 1 | 2005/03/10 17:00:00 | 3 |
| 3 | 1 | 2005/03/10 17:00:00 | 4 |

P.I.: Pair Id
I.K.: Index key

FIG. 4C

Update Location Table (ULT)

| I.K. | T.V.LBA | S.V.LBA |
|---|---|---|
| 1 | 0x1A-00-00-00 | 0x11-11-11-11 |
| 2 | 0x2B-3C-4D-5F | 0x11-12-13-14 |
| 3 | 0x1A-00-00-00 | 0x22-33-44-55 |
| 4 | 0x99-99-99-99 | 0x00-01-99-66 |

I.K.: Index Key   S.V: Snapshot volume
T.V: Target volume

FIG. 4D

| Target Volume Uuid | Pair serial number |
|---|---|
| av776f-UgE8-FtF1-xN6S-WVwb-D1Qq-7xEXW9 | 1 |
| Snapshot Volume Uuid | |
| HV1Rcr-Az9-srak-KTX9-lkfk-1740-wy50A2 | |

FIG. 5C

| Pair serial number | #th Snapshot | Create Point-in-time | Index Key |
|---|---|---|---|
| 1 | 1 | 2005/03/01 17:00:00 | 1 |
| 1 | 2 | 2005/03/02 17:00:00 | 2 |
| 1 | 3 | 2005/03/03 17:00:00 | 3 |
| 1 | 4 | 2005/03/04 17:00:00 | 4 |
| 1 | 5 | 2005/03/04 20:00:00 | 5 |

FIG. 5D

| Index Key | T.V.LBA | S.V.LBA |
|---|---|---|
| 1 | 4 | 1 |
| 1 | 2 | 2 |
| 1 | 7 | 3 |
| 1 | 8 | 4 |
| 2 | 2 | 5 |
| 2 | 3 | 6 |
| 2 | 7 | 7 |
| 3 | 1 | 8 |
| 3 | 2 | 9 |

| Index Key | T.V.LBA | S.V.LBA |
|---|---|---|
| 3 | 8 | 10 |
| 3 | 9 | 11 |
| 4 | 5 | 12 |
| 4 | 4 | 13 |
| 4 | 3 | 14 |
| 4 | 1 | 15 |
| 4 | 10 | 16 |
| 5 | 2 | 17 |
| 5 | 3 | 18 |

| Index Key | T.V.LBA | S.V.LBA |
|---|---|---|
| 5 | 7 | 19 |
| 5 | 1 | 20 |
| 5 | 8 | 21 |
| 5 | 9 | 22 |
| 5 | 5 | 23 |
| 5 | 4 | 24 |
| 5 | 10 | 25 |

FIG. 5E

| 2 | 3 | 7 | 1 | 8 | 9 | 5 | 4 | 10 |

Rollback to the processing queue of $T_2$

FIG. 5F

| 2 | 3 | 7 | 1 | 8 | 9 |

Rollforward to the processing queue of $T_4$

FIG. 5G

SNAPSHOT MECHANISM AND METHOD THEREOF

CROSS-REFERENCE TO RELATED APPLICATION

This application claims the priority benefit of Taiwan application serial no. 95117415, filed May 17, 2006. All disclosure of the Taiwan application is incorporated herein by reference.

BACKGROUND OF THE INVENTION

1. Field of Invention

The present invention relates to a snapshot mechanism. More particularly, the present invention relates to a snapshot mechanism adopting a rollforward and a many-to-one management method, which is adaptive to a remote snapshot mechanism.

2. Description of Related Art

To backup data for security, selection of a backup technique should take possible disasters, such as natural disasters, physical damage to the storage hardware and data corruption (including human errors, software errors, viruses, hacker invasion) into consideration. Only generating copies of the original data cannot solve the problem of data corruption. Thus, to correctly recover the data, the concept of version control should be adopted, and a snapshot technique meets the requirement.

The first advantage of the snapshot technique is that a current service will not be interrupted, by which the service level of the company will be improved. The second advantage is that a backup window is shortened, so frequently conducting snapshoot and backup the important data can be easily achieved. As such, a data loss window can be effectively shortened to reduce the estimated amount of data loss when disasters occur. The third advantage is that snapshot can solve the problem of data corruption. The above-mentioned backup window refers to the time needed for executing backup. The backup window is usually defined by the time needed for operating a backup process. For example, if data is needed from 8 a.m. to midnight, the window can be used to fabricate backup copies from midnight to 8 a.m. of the next day. However, to obtain consistent backup, data cannot be varied when being backed up. Therefore, in some circumstances, the backup window is also a time interval in which data and application programs cannot be used.

Copy-on-write (CoW) is the mainstream of practical snapshot manners, as it has good flexibility, scalability and can be practiced at a block level. Besides, the efficiency of snapshot at a block level is higher than at a file system level. As the CoW is independent from the file system in design, the dependency thereof to the file system does not need to be considered. In the snapshot of copy-on-write, when CoW occurs, the write action is suspended till the CoW action is finished. As for a remote snapshot, the time needed to suspend a write process will add double transmission time, the application performance is affected and weakened significantly.

In the development of snapshot techniques, LSI Logic Corporation Company proposed a snapshot technique in the U.S. Pat. No. 6,771,843 titled "Data Timeline Management Using Snapshot Volumes" published on Aug. 3, 2004. As shown in FIG. 1, the data loss window is shortened to reduce loss and avoid accidents caused by man-made improper operations. The snapshot technique of rollforward is achieved by reserving the snapshot data after the time point for rollback plus timeline management skills.

As shown in FIG. 1, according to the technique, snapshot volumes 110, 120, 130, 140 respectively reserve data at one o'clock, two o'clock, three o'clock and four o'clock on one day afternoon. When rolled back to the status reserved by the snapshot volume 120, the data is checked sequentially by an algorithm provided by the LSI Company, and the data required to be reserved is replicated into one or several appropriate volumes. Thus, to roll forward, the snapshot volume 130 or the snapshot volume 140 can be used to roll forward to the status at three o'clock or four o'clock. When system administrator makes an improper operation, the system can be recovered to the point-in-time before improper operation happened. To rollback to the snapshot volume 120, for example, the data of the snapshot volume 120 will be cleared, and Copy-on-Write (CoW) must be performed again for rolling forward, thus prolonging the recovery window in such a situation. Another disadvantage is that the block of the CoW may need to be replicated into a plurality of snapshot images, which results in the waste of resources.

In addition, LSI Logic Corporation Company proposed another snapshot technique in the U.S. Pat. No. 6,594,744 titled "Managing a snapshot volume or one or more checkpoint volumes with multiple point-in-time images in a single repository" published on Jul. 15, 2003, which supports a single snapshot volume to store a plurality of snapshot images. As shown in FIG. 2, all the snapshots belonging to the same target volume are stored in a big snapshot volume. For example, each snapshot of a target volume 210 is respectively stored in a snapshot volume 220 in sequence, for example, snapshots A, B, C and D are respectively stored in images A, B, C and D of the same snapshot volume 220. Similarly, each snapshot of the target volume 230 is respectively stored in a snapshot volume 240 in sequence, for example, snapshots E, F, G and H are respectively stored in images E, F, G and H in the same snapshot volume 240. That is, different target volumes respectively have the corresponding snapshot volumes.

SUMMARY OF THE INVENTION

As the performance of the above-mentioned conventional remote snapshot is influenced by the delay time of the network, the present invention correspondingly proposes an improved mechanism to alleviate the influence of network delay to the minimum. In addition, the present invention provides an improved rollback function and rollforward function. In the aspect of snapshot management, the present invention also provides an architecture of high manageability, i.e., a many-to-one architecture, so as to achieve a plurality of hosts to a single snapshot server, and a plurality of volumes to a single snapshot volume, thus lowering the management cost.

Further, the snapshot mechanism provided by the present invention effectively shortens the suspend time caused by Copy-on-Write (CoW), overlap and avoid redundant input/output actions, so as to improve the performance thereof. The invention provides a snapshot method, suitable for the snapshot operation of a target storage unit and a snapshot storage unit. In the snapshot method, when a write operation and triggering copy-on-write (CoW) is performed, the data stored in the address for data is replicated to be written in into a snapshot storage unit, and meanwhile data, desired to be written into, is temporarily stored in a buffer storage unit. The write data stored in the buffer storage unit is flushed into the target storage unit in a predetermined time interval after receiving the confirmation that the replicated data has been stored in the snapshot storage unit.

In an embodiment, the present invention provides a snapshot mechanism used in a data processing system to backup snapshot data. The data processing system comprises two hosts, which are respectively a target host and a snapshot host in a preferred embodiment. The target host in the snapshot mechanism is a source for generating data, i.e., the host containing data requiring to be protected by the snapshot technique. The snapshot host comprises providing a snapshot volume for storing a plurality of snapshot data generated after the target volume performs snapshot, and generating snapshot management data, wherein the snapshot management data comprises a relation pair table (RPT), a snapshot management table (SMT) and an update location table (ULT). Moreover, according to the snapshot management data, the above-mentioned target volume is rolled back or rolled forward to the status before a predetermined time.

The write request executed according to the remote snapshot mechanism of the present invention comprises checking whether any snapshot image of the target volume is established, and checking whether the ULT has a record of the LBA to be written into the target volume, wherein if the record of the LBA exists in the target volume, the write request is checked to find out whether a CoW is needed. If a CoW is needed, the new data is written to the buffer volume, and then unvaried data in the target volume is transmitted to the snapshot volume. The record about this CoW is added into the ULT and then the update data is written, thus completing the write request.

Further, the method for executing the rollback request provided by the present invention comprises generating a snapshot image data for the target volume so that the system can rollforward to the point-in-time before performing rollback; collecting all the LBAs belonging to the target volume in the ULT to a processing queue since the expected time point of rollback; finding out the oldest update record since the expected time point of rollback for each LBA of the processing queue in the ULT; and then reading the snapshot data from snapshot volume and writing it into the target volume, till all the addresses in the processing queue are processed.

The method for executing the rollforward request provided by the present invention comprises searching all the LBAs belonging to the target volume by the index key from the current create time point (but this time point is excluded) of the snapshot data to the time point for rollforward in the ULT; putting the LBAs into the processing queue; obtaining an address to be processed in the above-mentioned processing queue; searching for the oldest update record of this address after the time point for rollforward in the ULT; reading the snapshot data in the snapshot volume by the record; and then, writing back the snapshot data into the LBA of the target volume found in the ULT.

The snapshot mechanism of the present invention employs a many-to-one architecture together with the snapshot management data and improved method of rollback and rollforward, so as to achieve the effect of reducing the management cost, effectively shorten the suspend time caused by Copy-on-Write (CoW), overlap and avoid redundant input/output actions to the best, thereby improving the performance.

In order to make the aforementioned and other objectives, features and advantages of the present invention comprehensible, preferred embodiments accompanied with figures are described in detail below.

BRIEF DESCRIPTION OF THE DRAWINGS

FIG. 4B is a schematic view of the RPT according to the embodiment of the snapshot mechanism provided by the present invention.

FIG. 4C is a schematic view of the SMT according to the embodiment of the snapshot mechanism provided by the present invention.

FIG. 4D is a schematic view of the ULT according to the embodiment of the snapshot mechanism provided by the present invention.

FIG. 5C is the RPT according to the embodiment of the snapshot mechanism provided by the present invention, for representing the mapping relationship between the target volume and the snapshot volume.

FIG. 5D is the SMT according to the embodiment of the snapshot mechanism provided by the present invention, for establishing the sequence of the snapshot images.

FIG. 5E is the ULT of the embodiment of snapshot mechanism provided in the present invention to record the address of data originally in the target volume and the address when data is written into the snapshot volume.

FIGS. 5F and 5G are schematic views of the processing queue according to the embodiment of the snapshot mechanism provided by the present invention.

DESCRIPTION OF EMBODIMENTS

The snapshot mechanism provided by the present invention may effectively shorten the suspend time caused by Copy-on-Write (CoW), overlap and avoid redundant input/output actions to the best, so as to improve the performance.

Figure 1:
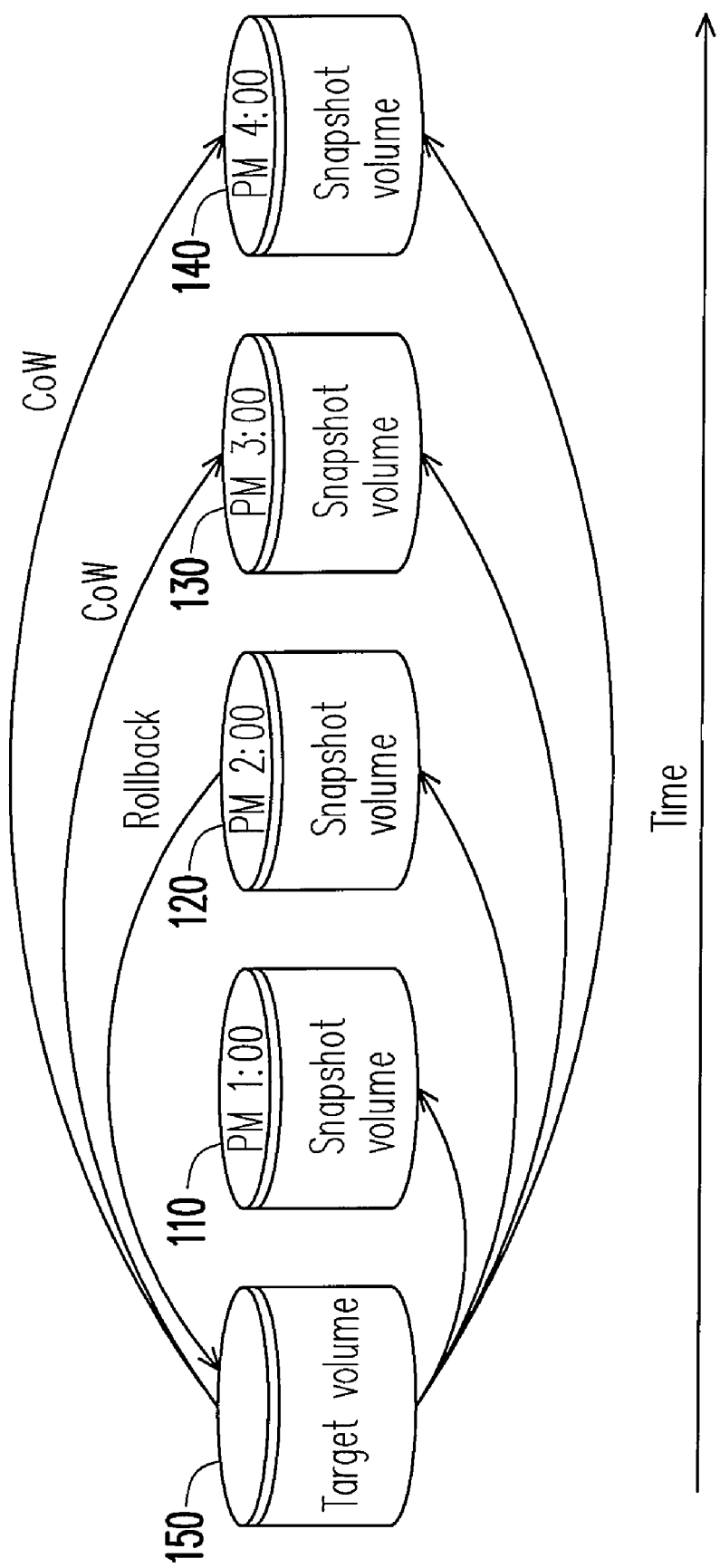
FIG. 1 is a schematic view of a conventional CoW technique.
Figure 2:
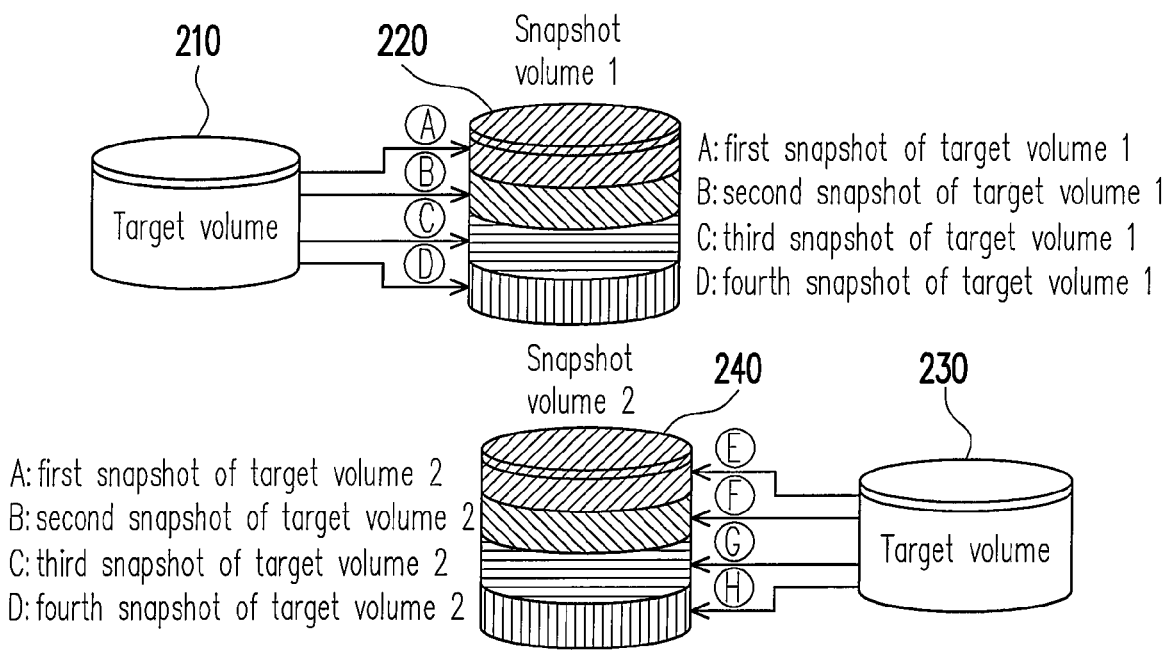
FIG. 2 is a schematic view of another conventional CoW technique.
Figure 3:
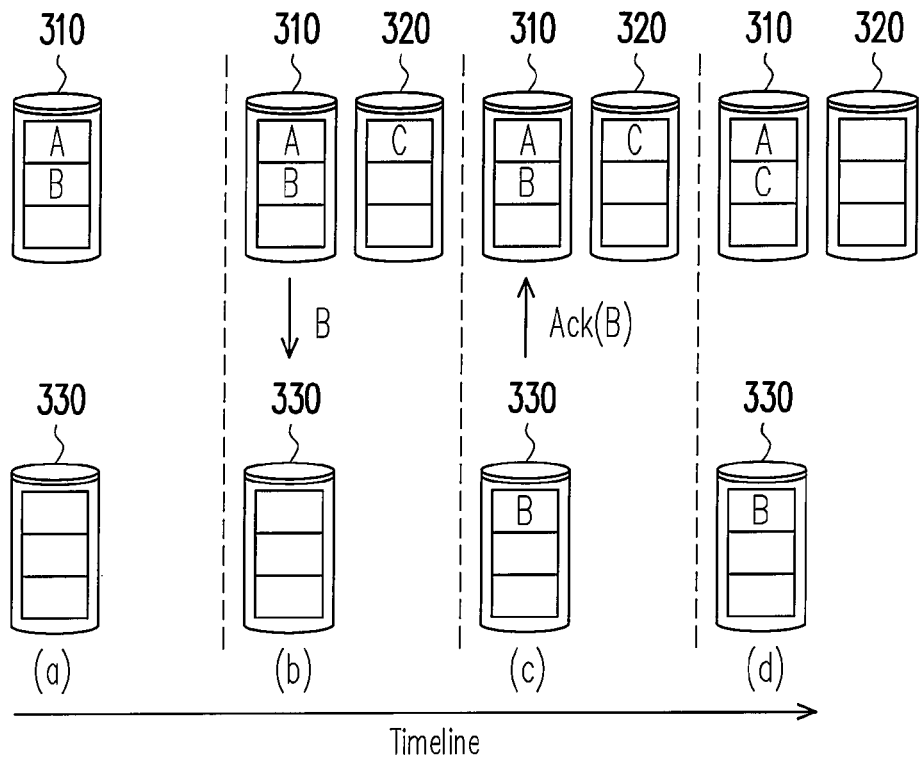
FIG. 3 is a snapshot mechanism according to an embodiment of the present invention, wherein the snapshot mechanism does not wait for receiving the response of successfully storing the data B in remote snapshot volume, so the reaction time is reduced by the transmission time on network as compared with the conventional remote snapshot.

In a preferred embodiment of accomplishing the snapshot mechanism provided by the present invention, FIG. 3 is a schematic view of an architecture and the operation according to a timeline in sequence. First, the architecture includes a target volume 310 and a snapshot volume 330. In addition to the target volume 310, the architecture further includes a buffer storage unit 320 for temporarily storing the data to be written when a request triggers the CoW. That is to say, the target volume 310 has data of blocks A and B. At this time, a request of replacing B data with C data is received, and the CoW is triggered at the same time.

At this time, data B is read and transmitted to a snapshot volume 330, and data C which originally should be written into the block position for storing data B is immediately guided to the buffer storage unit 320, for example, at the time of a timeline mark (b). Such an action does not need to wait for the response of receiving and successfully storing the transmitted data B ("Ack(B)" signal as shown in the figure), so the suspend time is reduced by a transmission time as compared with the conventional snapshot.

In the above-mentioned snapshot mechanism provided by the present invention, the target volume 310 and the snapshot volume 330 may be used in any form of a network connection. For example, if the above two volumes are used in a local area network ("LAN"), the target volume 310 and the snapshot volume 330 are respectively nodes in the LAN. If the above two volumes are used in a wide area network ("WAN") or Internet, the snapshot mechanism provided by the present invention is a remote snapshot mechanism, and the target volume 310 and snapshot volume 330 can respectively be any connection nodes in the network. Besides, the above-mentioned target volume 310 and snapshot volume 330 may also be used in other forms such as connections of wireless communication or connections of satellite communication.

The buffer storage unit 320 is not limited to any form, as long as it can temporarily store data, for example, another buffer volume or memory device. The reason for using the buffer storage unit 320 is to avoid data being written into the block in the target volume 310 that the block already having data, thus preventing the block from being improperly erased or covered.

Further, the manner of flushing the block of data in the buffer storage unit 320 into the target volume has the following principles:

1. When being read, the block is also flushed to save the reading time.
2. If the above condition is not satisfied, the data in the buffer storage unit 320 is transmitted to the target volume 330 in a predetermined time interval.

The snapshot mechanism provided by the embodiment may shorten the suspend time caused by Copy-on-Write (CoW), and reduce the redundant input/output (I/O) actions to the best, so as to improve the performance.

As for the management of the snapshot mechanism provided by the invention, an architecture with high manageability is provided, i.e., a many-to-one architecture, so as to achieve a plurality of hosts to a single snapshot server and a plurality of volumes to a single snapshot volume, thus lowering the management cost. When confronted with a large scale, the system manager may flexibly use a plurality of snapshot servers to write volume snapshot data in computers of different groups arranged beforehand into different snapshot servers. In order to reduce the management cost of a plurality of snapshots and make the snapshot mechanism become effective and convenient, the management mechanism provided by the invention uses group management. In the embodiment, the architecture supports a plurality of target volumes in different hosts, so as to store a plurality of snapshots at different time points into the same snapshot volume of the snapshot server. In an embodiment as shown in FIG. 4A, target volumes 411 and 413 of a host 410 and a target volume 421 of a host 420 respectively have four times of snapshots, i.e., (A, B, C, D), (E, F, G, H) and (I, J, K, L) as shown, which are respectively stored in the snapshot volumes in a snapshot server 430.

Therefore, the convenience of management is improved. In enterprises, the frequency of fabricating snapshots with an important target volume depends on the importance of data and the requirements from the data loss window.

In the architecture of the present embodiment, the size of the snapshot volume can be adjusted once without adjusting a plurality of snapshot volumes many times as for the conventional snapshot, and the management mechanism of snapshot data block provided by the present invention is also adopted to prevent the same data block in the conventional snapshot from repeatedly appearing in a plurality of snapshot volumes.

Figure 4A:
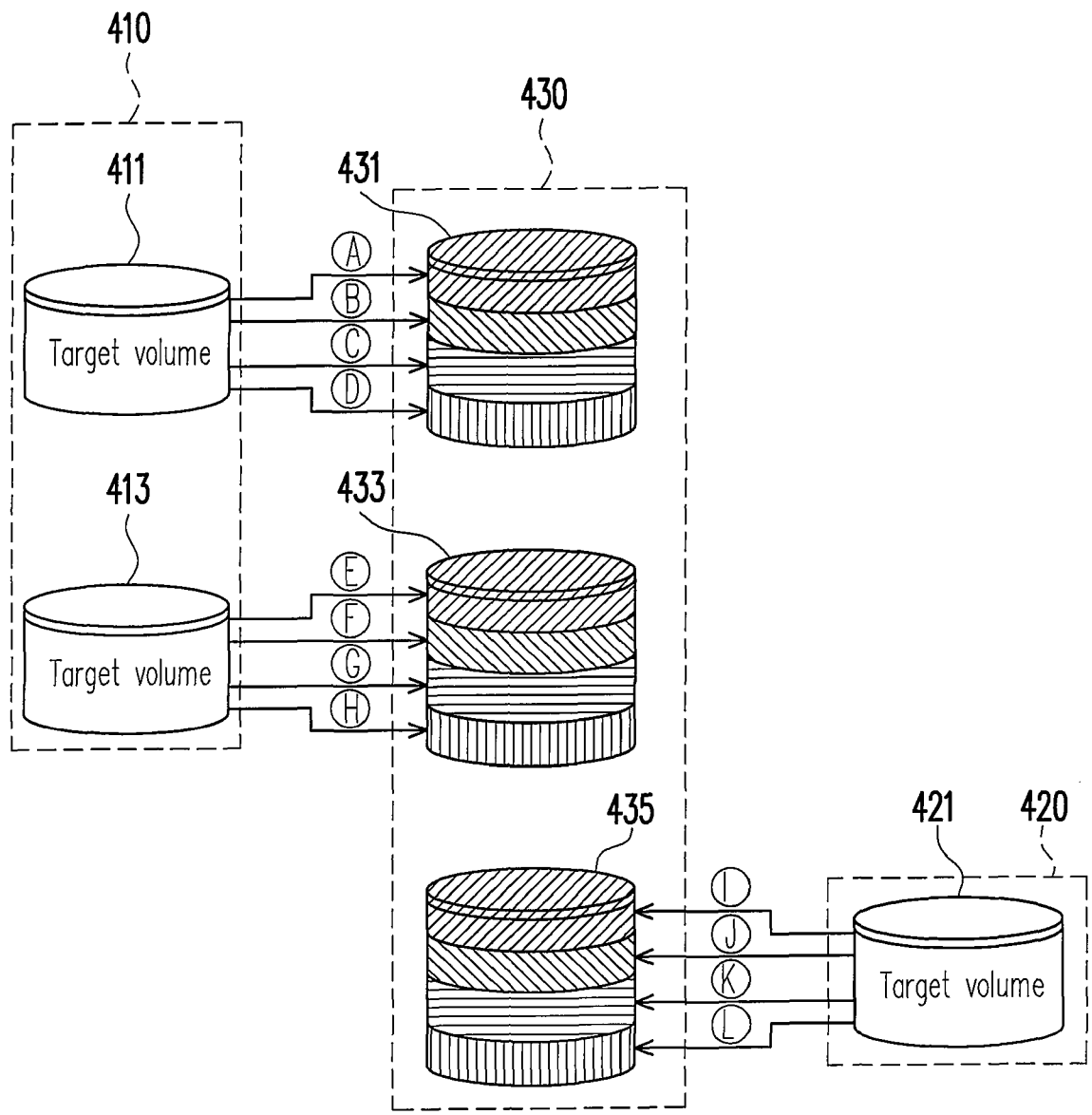
FIG. 4A is a schematic view of the snapshot mechanism according to an embodiment of the present invention, wherein the architecture thereof employs a mode of a plurality of target volumes to a single snapshot volume.

In the present embodiment, several tables are used to achieve the provided snapshot mechanism as shown in FIGS. 4B, 4C and 4D. The tables includes, for example, a relation pair table (RPT), a snapshot management table (SMT) and an update location table (ULT), et al. Referring to FIG. 4A, the snapshot images in each target volume are stored in a snapshot volume, and such a relationship is called a relation pair in the architecture. Therefore, in the RPT, each entry data represents the mapping relationship between a target volume on a host and the snapshot volume thereof. Each entry data is recorded with a pair ID ("P.I." for short below) for generating a relationship with the SMT, and such a manner refers to the technique of relational database. As shown in FIG. 4B, each entry data in the RPT records, for example, an IP address of source host, a target volume uuid, an IP address of destination host, a snapshot volume uuid and a pair ID.

As shown in FIG. 4C, each entry data in the SMT includes "P.I.", #th snapshot, create point-in-time and index key ("I.K."). In the RPT, as each entry data represents the mapping relationship between the target volume on a host and the remote snapshot volume thereof, the volumes are all recorded with a unique pair ID for identifying the mapping relationship. In the SMT, different snapshot images corresponds to different snapshot serial numbers, and the snapshots are respectively given a unique index key (I.K.). As shown in FIG. 4D, each entry in the ULT records, for example, LBA from the target volume (T.V. LBA), and destination LBA of the snapshot volume (S.V. LBA) and the corresponding I.K.

The same target volume is likely to have several snapshots at a plurality of time points, so in the SMT, a field is needed to record the sequence for creating snapshots. Therefore, the #th snapshot in FIG. 4C takes charge of this task. Another important field is the create point-in-time, which records the time point for creating snapshots. Referring to FIG. 4C, the time for creating snapshots by the target volume with a pair ID of 1 is respectively at 5 p.m. on Mar. 10, 2005 and Mar. 11, 2005, and the information of SMT can show the establishment sequence of the snapshot of each target volume. The function of I.K. is to generate relationship with the ULT, so that the entry data of the ULT can be traced back to which target volume corresponding to which snapshot volume and the create point-in-time. Certainly, in the ULT, the address of the data block originally in the target volume is recorded and destination block address of the snapshot volume. The above-mentioned RPT, SMT and ULT cooperate with each other, so as to use pair ID and I.K. to generate connection relationship and adopt the designed algorithm to achieve each expected function.

Figure 5A:
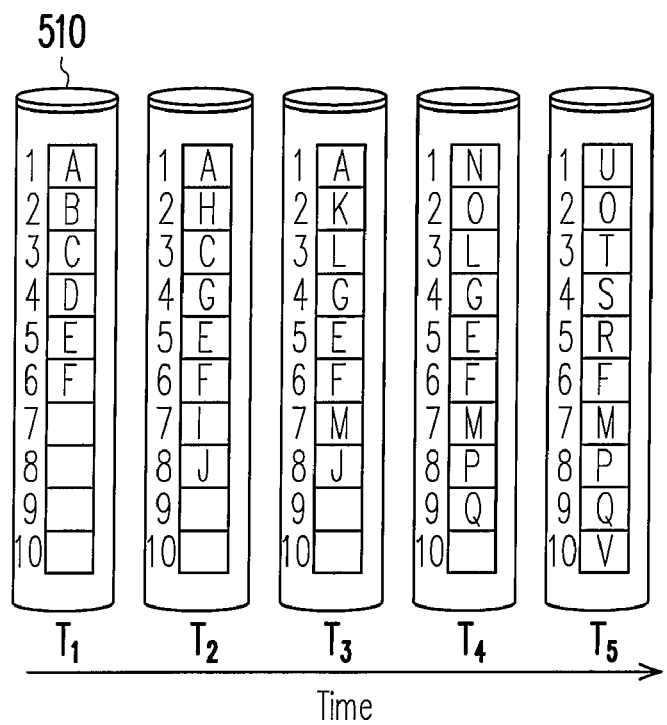
FIG. 5A is a schematic view of the variation of data in the target volume of the snapshot mechanism according to an embodiment of the present invention.
Figure 5B:
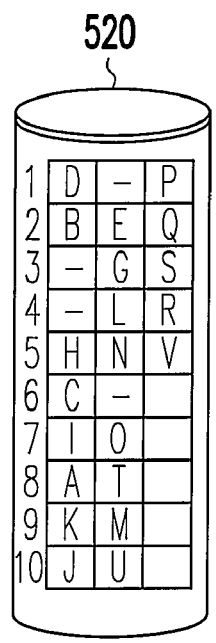
FIG. 5B is a schematic view of the variation of data in the snapshot volume of the snapshot mechanism according to an embodiment of the present invention.

Next, the architecture implemented by the snapshot mechanism provided by the invention and the operations according to the timeline in sequence are illustrated with reference to drawings in detail. Referring to FIGS. 5A to 5E, first, the operation is illustrated together with the part of a target volume 510 as shown in FIG. 5A and the part of a snapshot volume 520 in FIG. 5B, and the RPT records the universal unique identifiers of the target volume 510 and the snapshot volume 520 and corresponding pair ID in FIG. 5C. Of course, those skilled in the art will know that, when being used in a WAN or Internet, the snapshot mechanism provided by the present invention is a remote snapshot mechanism. In addition to the universal unique identifier and pair ID, the RPT of the target volume 510 and the snapshot volume 520 may also be added with IP (Internet Protocol) addresses, which can be varied according to practical requirements.

The process of data variation of the snapshot volume 510 is shown in FIG. 5A, in which four snapshots are respectively created at time points T1 to T4, and it is assumed that the time points are respectively 5 p.m. from Mar. 1, 2005 to Mar. 4, 2005 in FIG. 5D. The scenario of example is assumed that the system will be rollbacked to T2 from T5, then rollforwarded to T4 from T2.

This part of illustration is divided into three parts. The first part is from time T1 to T5, where a part of the blocks of the target volume 510 is overwritten, and the content of the snapshot volume 520 and the ULT is gradually increased. During time T1 to T2, the write actions occurring are writing "G" into address 4, "H" into address 2, "I" into address 7, and "J" into address 8 in sequence. As a snapshot is created at time T1, when "G" is to be written, CoW is activated to replicate "D" in address 4 into the first address in the snapshot volume 520 (referring to FIG. 5B) and add a record of I.K. of 1, LBA of the target volume 510 (T.V. LBA) of 4, LBA of the snapshot volume 520 (S.V. LBA) of 1 into the ULT (referring to FIG. 5E).

The copy mechanism of CoW is also activated due to snapshot when "H", "I" and "J" are written. The records of the LBAs of the target volume 510 (T.V. LBA) as 2, 7, 8 and LBAs of the snapshot volume 520 (S.V. LBA) as 2, 3, 4 are respectively added into the ULT, and "B", "-" (representing no data), "-" (representing no data) are stored.

Then, during time T2 to T3, writing "K" into address 2, "L" into address 3, and "M" into address 7 occur in succession. The ULT in FIG. 5E is added with three records of I.K. of 2. "H", "C", and "I" are replicated to the LBAs of the snapshot volume 520 (S.V. LBA) as 5, 6, 7. During time T3 to T4, "N" is written into address 1, "O" into address 2, "P" into address 8, and "Q" into address 9. Like the above several writes, CoW also occurs. The ULT is added with records of I.K. of 3. The LBAs of the target volume 510 (T.V. LBA) are 1, 2, 8, 9, and the LBAs of the snapshot volume 520 (S.V. LBA) are 8, 9, 10, 11.

With the same operation, during time T4 to T5, addresses 5, 4, 3, 1, 10 are respectively replaced by "R", "S", "T", "U" and "V", and the LBAs of the target volume 510 (T.V. LBA) are respectively 5, 4, 3, 1, 10, and LBAs of the snapshot volume 520 (S.V. LBA) are respectively 12, 13, 14, 15, 16. Till now, they are all pure CoWs.

Next, it is assumed to perform the step of rolling back to time T2 at the time of 8 p.m. on Mar. 4, 2005 (T5). First, the snapshot of the target volume is created, and an entry data of snapshot is added into the SMT. Then, according to the flow chart of rollback in FIG. 7, the addresses to be processed are collected into a processing queue, referring to addresses "2", "3", "7", "1", "8", "9", "5", "4" and "10" stored in the processing queue shown in FIG. 5F. Before being recovered, each address is executed by CoW into the snapshot volume 520. Under the status of T5, the corresponding data "O", "T", "M", "U", "P", "Q", "S", "R" and "V" stored in processing queue addresses "2", "3", "7", "8", "9", "5", "4" and "10" are respectively stored into addresses 17~25 in the snapshot volume 520. Thus, the rollback procedure is finished.

Now, the target volume 510 belongs to the status of time T2. Assuming that it is required to rollforward to the status of time T4 now, first, all the addresses recorded at time T2 and T3 are collected as the addresses "2", "3", "7", "1", "8" and "9" stored in the processing queue as shown in FIG. 5G. Then, the oldest record of each address after T4 is searched in the ULT. According to the record, data is directly read and written back into the target volume 510. Until all the addresses in the queue are processed, the procedure of rollforward is finished.

Referring to FIG. 5D, as the same target volume has snapshots at a plurality of time points, in the SMT, a field is needed to record the sequence for creating snapshots. Therefore, "#th Snapshot" in FIG. 5D takes charge of this task. Another important field is "create point-in-time" to record the time point for creating snapshots. Referring to FIG. 5D, the time for creating snapshots by the target volume with the pair ID of 1 is respectively at 5 p.m. on Mar. 1, 2005 and Mar. 2, 2005, etc., and the information of SMT may establish the sequence of establishment of the snapshot of each target volume. The function of I.K. is to generate relationship with the ULT in FIG. 5E, so that the records of the ULT can be traced back to which target volume corresponding to which snapshot volume and the create point-in-time.

Of course, in the ULT, the addresses of the data block originally in the target volume and destination block addresses of snapshot volume are recorded. The RPT, SMT and ULT cooperate with each other, so as to adopt the connection relationship between the pair ID and I.K. together with the designed algorithm to achieve each expected function.

The schematic views of the architecture of the snapshot mechanism and the operations based on the timeline in sequence according to a preferred embodiment of the present invention in FIGS. 5A to 5E mention the procedures about data writing, rollbacking and rollforwarding. In order to illustrate the application of the present invention more clearly, the following FIGS. 6A, 6B, 7 and 8 illustrate in detail the embodiments of the flow of the above-mentioned data writing, rollbacking and rollforwarding in sequence.

Figure 6A:
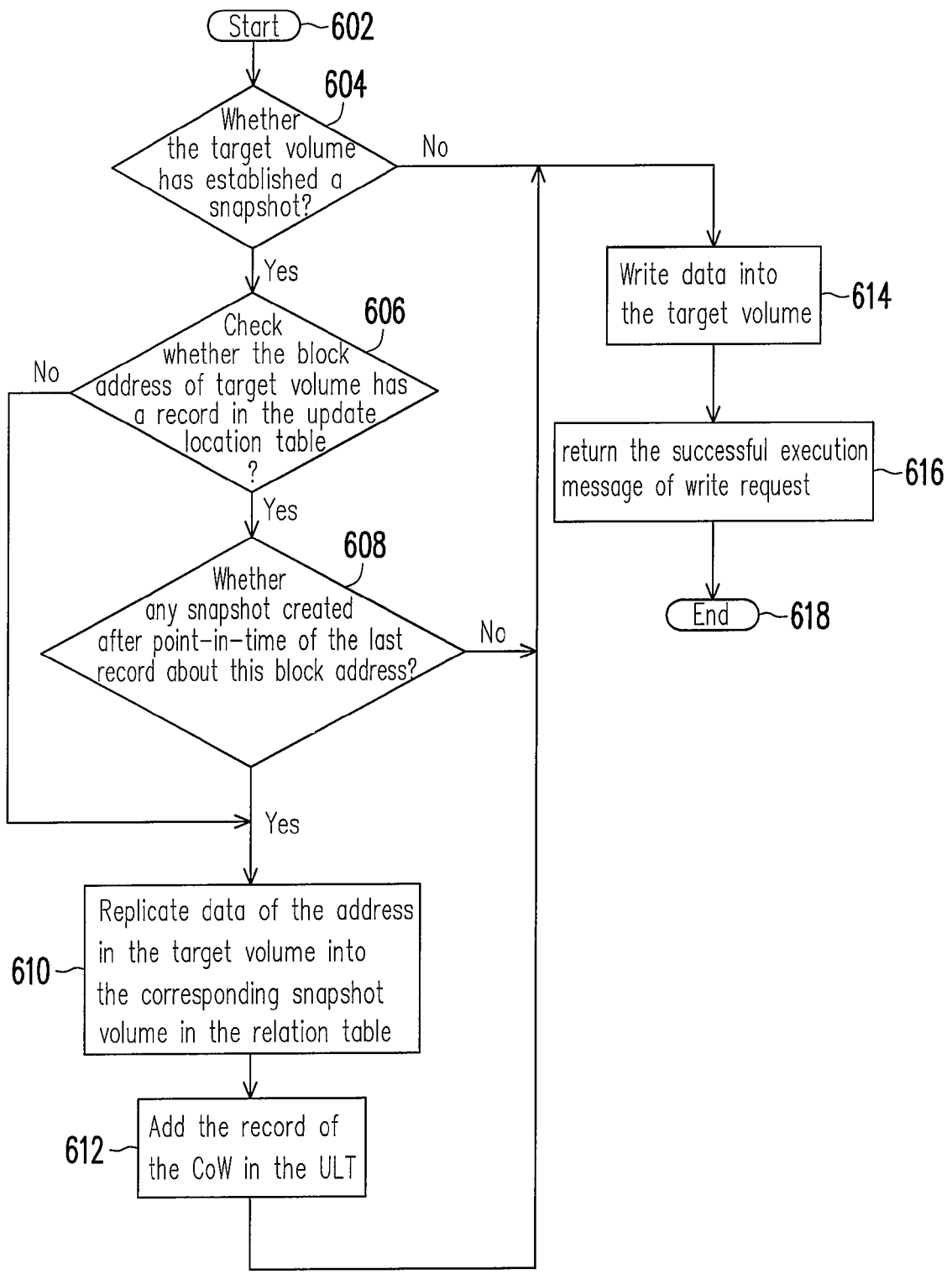
FIGS. 6A and 6B are flow charts of the snapshot mechanism, in which the snapshot volume are respectively local or remote according to an embodiment of the present invention, when write is requested, as whether the action of CoW should be performed is to be determined, rules in the flow chart should be followed.

Referring to FIG. 6A, when write request is occurred, as it is required to determine whether the action of CoW should be performed, rules should be established, that is, the write flow chart of FIG. 6A. In the embodiment, the snapshot volume is a local volume, that is, the snapshot volume is located in the same local network with the target volume. Once the write request is received, it is started from Step 602 of the write flow chart of FIG. 6A. First, in Step 604, the RPT is queried to confirm whether the target volume to be written creates snapshots. If not, data is written into the target volume directly as a normal writing (Step 614). Then, the successful execution message of the write request is returned (Step 616), and the process is finished and left (Step 618).

However, assuming the judged result in Step 604 is that the target volume has created snapshots, the ULT is further queried for whether there is any record of the destination block address (Step 606). If the record exists and no snapshot is created thereafter (Step 608), then directly write, returned and leave without CoW (Steps 614, 616 and 618). If it is found that the address to be written has no record in the ULT in Step 606, directly skip Step 608 and perform Step 610. The data of this address in the target volume is replicated to the corresponding snapshot volume in the RPT (Step 610). Then, a record of this CoW is added into the ULT (Step 612). Last, data is written into this address, returned and left (Steps 614, 616 and 618). If the condition judgment is true in Step 606, and it is found that the record of snapshot establishment exists after the last time point of variation of the block recorded in the ULT in Step 608, the data which will be overwritten in the address is should be replicated to the snapshot volume (Step 610), and the record is added into the ULT (Step 612), then data is written to target volume, returned and left (Steps 614, 616 and 618).

After snapshots are created, data of each target volume is respectively replicated and written into the corresponding snapshot volume. The I.K. in the ULT can be used to find out the create point-in-time of snapshot in the SMT. Then, the original address of the data block in the target volume and the current address of the data block in the snapshot volume can be obtained via the relation pair serial number. Thus, all the information required for performing rollback or rollforward can be found in the three tables. With the cooperation of the rollback procedure and the rollforward procedure of the present invention, the time point at which a certain snapshot is created can be obtained through rollback or rollforward on the timeline at will.

Figure 6B:
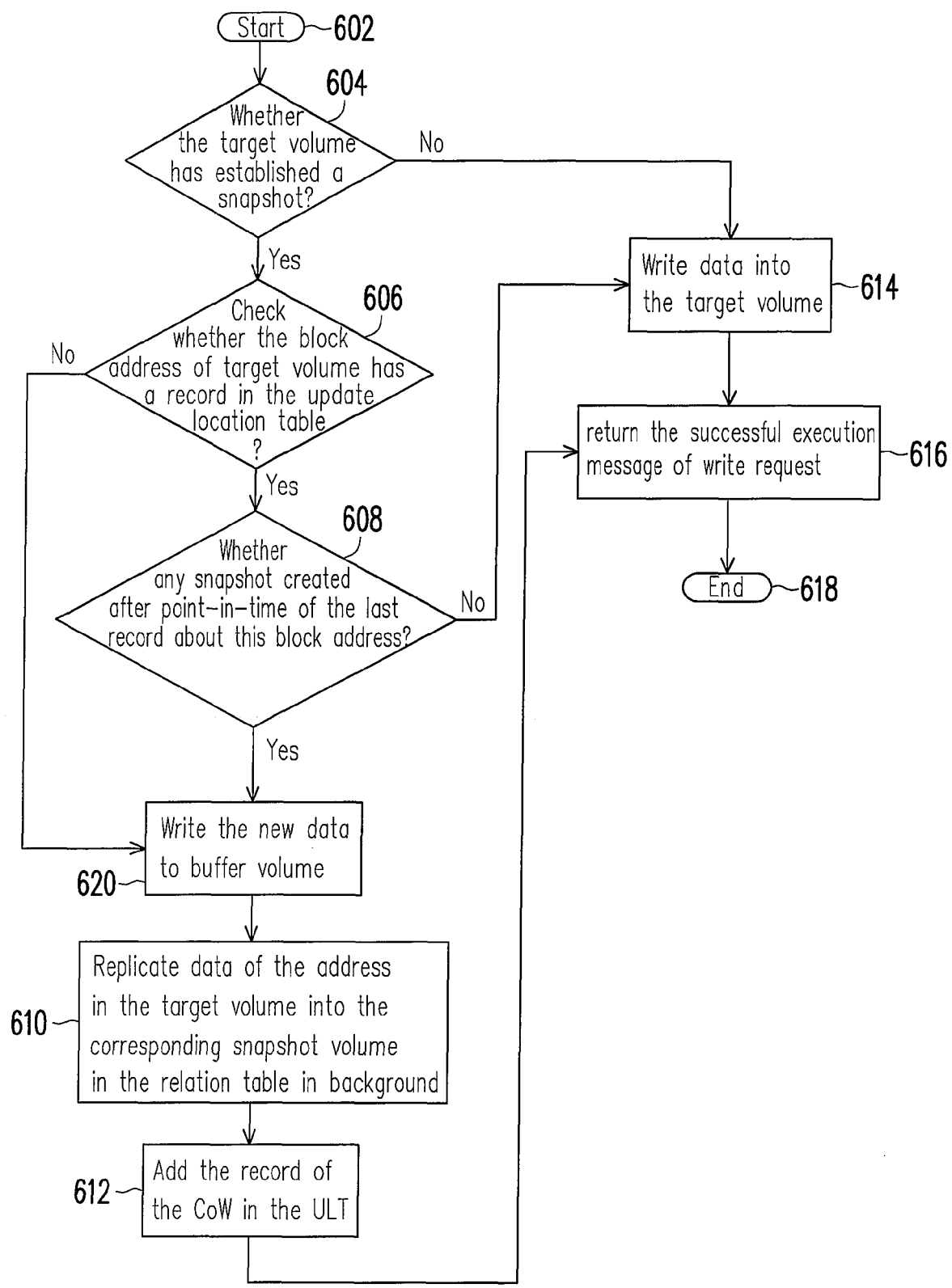

Referring to FIG. 6B, when write request is occurred, as it is required to determine whether the action of CoW should be performed, rules should be established, that is, the write flow chart of FIG. 6B. In the embodiment, the snapshot volume is a remote snapshot volume, that is, the snapshot volume is not located in the same local network with the target volume. In FIG. 6B, steps are similar with the steps in FIG. 6A, except for the step 620 located between the step 608 and the step 610 to avoid suspend time caused by the data transmission by writing the new data to the remote snapshot volume. In the embodiment, after the ULT is queried for whether there is any record of the destination block address (step 606), if it is found that the address to be written has no record in the ULT, directly skip step 608 and write the new data to buffer volume, as in step 620. Then the data of this address in the target volume is replicated to the corresponding snapshot volume in the RPT (step 610), and the record is added into the ULT (step 612), then data is written to target volume, returned and left (steps 614, 616 and 618).

If the condition judgment is true in step 606, and it is found that the record of snapshot establishment exists after the last time point of variation of the block recorded in the ULT in step 608, the new data is written into the buffer volume, as in step 620. Then the data of this address in the target volume is replicated to the corresponding snapshot volume in the RPT (step 610), and the record is added into the ULT (step 612), then, the successful execution message of the write request is returned and left (steps 616 and 618). If it is found that the record of snapshot establishment does not exist after the last time point of variation of the block recorded in the ULT in step 608, the data is written to target volume (step 614) and, then, the successful execution message of the write request is returned and left (steps 616 and 618).

Figure 7:
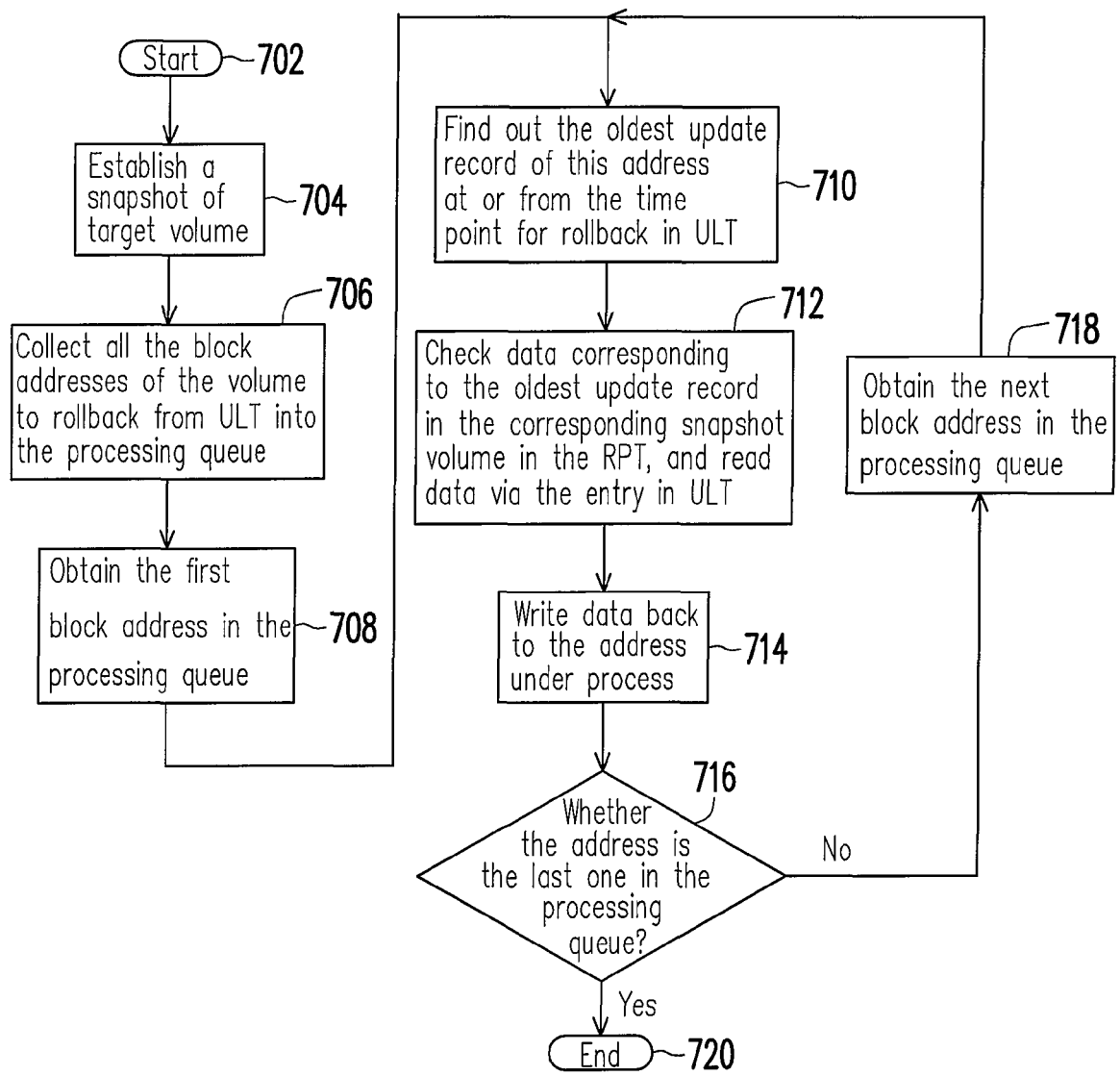
FIG. 7 is a flow chart of the rollback procedure according to an embodiment of the present invention.

FIG. 7 mainly illustrates the procedure of rollback. As it is required to provide the status that can be recovered before rollback, in the rollback procedure in FIG. 7, Step 704 is to establish snapshots for the target volume to be rolled back. Next, Step 706 is to collect all the block addresses belonging to the volume to be rolled back from the ULT into a processing queue, and the snapshot create time belonging to these records must at or from the time point of establishing the snapshot to be rolled back. Assuming a snapshot is created at 5 p.m. from Monday to Thursday, if it is desired to rollback to the afternoon on Tuesday, the collected block addresses to be processed belongs to the record at or from 5 p.m. on Tuesday, and is put into the processing queue without repetition. After the collection is finished, continue to perform the next Step 708. The first block address is obtained in the processing queue, and the oldest update record of the block address at or from the rollback time point is checked in the ULT (Step 710). Next, according to the record in the ULT, the RPT is queried to finding the corresponding snapshot volume, and read the data via the entry in ULT (Step 712), and the data is then written back to the address under process (Step 714). Next, it is checked whether the address is the last element in the processing queue (Step 716). If the address is the last element, leave (Step 720); if not, the next process address is obtained in Step 718, and Step 710 is repeated to continue processing till the condition in Step 716 is met.

It should be noted that, the difference between FIG. 7 and the conventional snapshot, the snapshot proposed by LSI is that, the snapshot data after rollbacking to target volume is not deleted at all in the present architecture. Thus, there are two advantages. The data of the time point has two copies, which provides higher data availability and having shorter recovery time. When other recovering tasks are performed, the step of CoW is also omitted, which facilitates achieving the recovery time objective (RTO).

Figure 8:
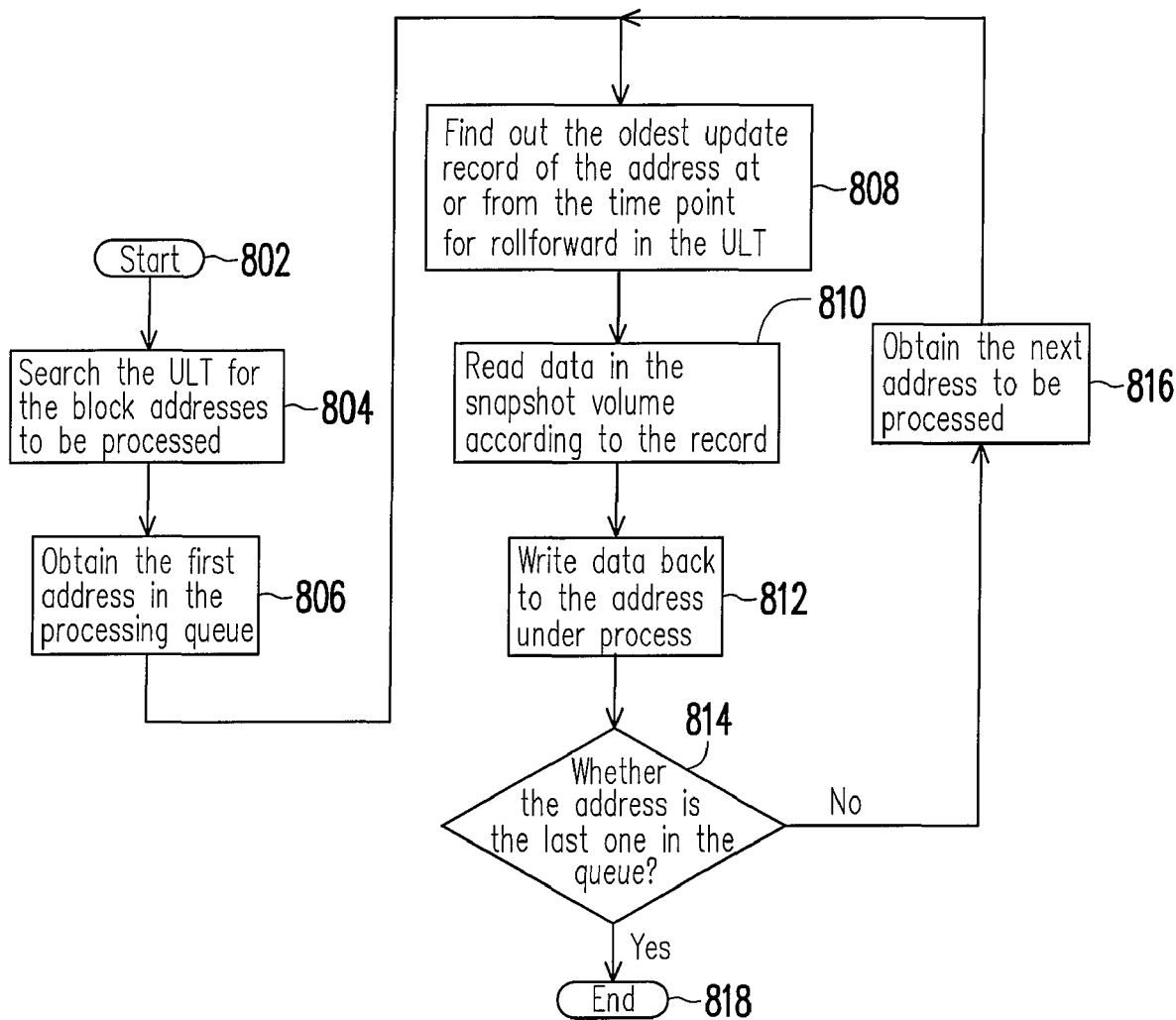
FIG. 8 is a flow chart of the rollforward procedure according to an embodiment of the present invention.

Next, referring to FIG. 8, relative to rollback, rollforward is the forward effect on the timeline, and the principle thereof is consistent with that of rollback. However, the search range of overwritten blocks and storing the data block addresses is different from the search range when rollback, which is illustrated in detail with the flow chart of FIG. 8. After Step 802 is started, the block addresses to be processed are searched in the ULT (Step 804) on condition that the snapshot create time of these records belongs to the period from the snapshot create time of the current status to the desired time point for rollforward (but this time point is excluded). As for creating a snapshot at 5 p.m. from Monday to Thursday for illustration, it is assumed that it has been rolled back to the Tuesday afternoon. If it is desired to rollforward to Thursday, the block addresses of the records of the time of Tuesday and Wednesday are collected from the ULT, and put into the processing queue. Next, the first address to be processed is obtained in the queue (Step 806). Then, the oldest update record of the address at or from the time point for rollforward is searched in the ULT (Step 808). For the above example, it is required to find out the oldest update record of the block address at or from 5 p.m. Thursday. Next, the I.K. is used to find out the relation pair serial number and the corresponding snapshot volume. Then, according to this record, the data in the LBA of the snapshot volume is read (Step 810), and then written back to the LBA of the target volume (Step 812). After that, it is checked whether the address is the last one in the queue (Step 814). If yes, leave (Step 818); if not, the next address is obtained (Step 816), and Step 808 is repeated to continue processing till the condition in Step 814 is met, and then leave.

In view of the above, the present invention may improve the performance of the remote snapshot of CoW under the block level, and enhance the function of snapshot. In addition to the existing rollback, the present invention adds rollforward (or rollback forward). Further, a plurality of hosts to a single snapshot server and a plurality of volumes to a single snapshot volume are adopted to improve the management.

Additionally, the remote snapshot mechanism provided by the present invention may effectively shorten the suspend time caused by Copy-on-Write (CoW), overlap and avoid redundant input/output actions to the best, so as to improve the performance.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A snapshot method, suitable for the snapshot operation of a target storage unit and a snapshot storage unit, the snapshot method comprising:

when performing a write operation for writing first data into the target storage unit and triggering copy-on-write (CoW), replicating second data stored in an address of the target storage unit for the second data to be written into a snapshot storage unit, and meanwhile temporarily storing the first data to be written into the target storage unit into a buffer storage unit; and flushing the first data to be written and stored in the buffer storage unit into the target storage unit in a predetermined time interval after receiving a confirmation that the replicated second data has been stored in the snapshot storage unit.

2. The snapshot method as claimed in claim 1, wherein the snapshot storage unit is used to store a plurality of snapshot data generated after snapshot for a plurality of target storage units of other hosts connected through network.

3. The snapshot method as claimed in claim 2, further comprising generating snapshot management data corresponding to a relationship between a plurality of snapshot data generated after snapshot of the plurality of target storage units and the snapshot storage unit.

4. The snapshot method as claimed in claim 3, wherein the snapshot management data comprises:

a relation pair table (RPT), representing a mapping relationship between the target storage unit and the snapshot storage unit;

a snapshot management table (SMT), for storing a time stamp of each establishment of a plurality of snapshot images in order to manage the snapshot images by a timeline; and an update location table (ULT), for recording a logical block address of the snapshot data originally in the target storage unit and the logical block address when the data is written into the snapshot storage unit.

5. The snapshot method as claimed in claim 4, wherein the write operation comprises:

checking whether the snapshot management data of the target storage unit in which the first data is to be written is generated;

checking whether there is record of the logical block address corresponding to the first data to be written in the target storage unit in the ULT, wherein if the record exists, check whether the write operation needs CoW, and if so, replicate the first data to be written to the buffer storage unit and then transmit the second data corresponding to the logical block address of the second data to be written to the snapshot storage unit; and adding the record about the write operation into the ULT.

6. The snapshot method as claimed in claim 4, further comprising performing a rollback procedure to the target storage unit, comprising:

establishing a snapshot for the target storage unit to perform rollback;

collecting all the logical block addresses belonging to the target storage unit to perform rollback from the ULT into a processing queue, wherein the snapshot create time of the logical block address is at or from the snapshot create time point for rollback; and performing the following procedures for each logical block address in the processing queue sequentially, comprising:

checking an oldest update record of the logical block address after the rollback time point in the ULT;

querying the RPT to find the corresponding snapshot volume according to the oldest record in the ULT; and reading and writing the data back to the logical block address under process, till all the logical block addresses in the processing queue are processed.

7. The snapshot method as claimed in claim 6, further comprising performing a rollforward procedure to the target storage unit, comprising:

according to the target storage unit to perform the rollforward procedure, searching the ULT for block addresses to be processed at a snapshot create time from the current snapshot create time to the time point for rollforward; and performing the following procedures to each logical block address in the processing queue in sequence, comprising:

checking an oldest update record of the logical block address after the rollforward time point in the ULT;

finding the snapshot storage unit corresponding to the oldest update record, and reading the data stored in the logical block address corresponding to the oldest update record; and writing back the logical block address of the target storage unit to perform the rollforward procedure, and performing the logical block addresses in the next processing queue, until all the logical block addresses in the processing queue are processed.

8. The snapshot method as claimed in claim 1, wherein the target storage unit and the snapshot storage unit are connected by a local area network (LAN).

9. The snapshot method as claimed in claim 1, wherein the target storage unit and the snapshot storage unit are connected by a wide area network (WAN) or Internet.

10. The snapshot method as claimed in claim 1, wherein the target storage unit and the snapshot storage unit are connected by a manner of wireless communication.

11. The snapshot method as claimed in claim 1, wherein the target storage unit and the snapshot storage unit are connected by a manner of satellite communication.

12. The snapshot method as claimed in claim 1, wherein the buffer storage unit is a buffer volume.

13. The snapshot method as claimed in claim 1, wherein the buffer storage unit is a memory device.

14. A snapshot system, suitable for the operation of snapshot between a first system and a second system connected by network, the snapshot system comprising:

the first system, comprising a target storage unit configured for storing data; and the second system, connected to the first system through the network, comprising a snapshot storage unit configured for storing snapshot data of the target storage unit, and a buffer storage unit configured for temporarily storing data to be written to the target storage unit, wherein:

when first data is desired to be written into the target storage unit in the first system, and copy-on-write (CoW) is triggered, the first system is configured for replicating second data stored in an address of the target storage unit for the second data desired to be written into the snapshot storage unit of the second system by a network, and meanwhile temporarily storing the first data desired to be written into the target storage unit into the buffer storage unit of the first system; and the first system is also configured for flushing the first data to be written and stored in the buffer storage unit into the target storage unit in a predetermined time interval after receiving a confirmation that the replicated second data has been stored from the snapshot storage unit of the second system.

15. The snapshot system as claimed in claim 14, wherein the snapshot storage unit is used to store a plurality of snapshot data generated after snapshot for a plurality of target storage units of the first system connected by the network.

16. The snapshot system as claimed in claim 15, further comprising: the second system is configured for generating snapshot management data corresponding to a relationship between a plurality of snapshot data generated after snapshotting the plurality of target storage units and the snapshot storage unit.

17. The snapshot system as claimed in claim 14, wherein the snapshot management data comprises:
   a relationship pair table (RPT), representing the mapping relationship between the target storage unit and the snapshot storage unit;
   a snapshot management table (SMT), for storing a time stamp of each establishment of a plurality of snapshot images in order to manage the snapshot images by a timeline; and
   an update location table (ULT), for recording the logical block address of snapshot data originally in the target storage unit and the logical block address when data is written into the snapshot storage unit.

18. The snapshot system as claimed in claim 17, wherein the write operation comprises:
   checking whether the snapshot management data of the target storage unit in which the data to be written is generated;
   checking whether there is record of the logical block address corresponding to the first data to be written in the target storage unit in the ULT, wherein if the record exists, check whether the write operation needs CoW, and if so, replicate the first data to be written to the buffer storage unit and then transmit the second data corresponding to the logical block address of the second data to be written to the snapshot storage unit of the second system; and
   adding the record about the write operation into the ULT.

19. The snapshot system as claimed in claim 17, wherein the first system is also configured for performing a rollback procedure to the target storage unit, and the rollback procedure comprises:
   establishing a snapshot for the target storage unit to perform rollback;
   collecting all the logical block addresses belonging to the target storage unit to perform rollback from the ULT into a processing queue, wherein the snapshot create time of the logical block address is at or from the snapshot create time point for rollback; and
   performing the following procedures for each logical block address in the processing queue sequentially, comprising:
      checking an oldest update record of the logical block address after the rollback time point in the ULT;
      querying the RPT to find the corresponding snapshot volume according to the oldest record in the ULT; and
      reading and writing the data back to the logical block address under process, till all the logical block addresses in the processing queue are processed.

20. The snapshot system as claimed in claim 17, wherein the first system is also configured for performing a rollforward procedure to the target storage unit, and the rollforward procedure comprises:
   according to the target storage unit to perform the rollforward procedure, searching the ULT for block addresses to be processed at a snapshot create time from the current snapshot create time to the time point for rollforward; and
   performing the following procedures for each logical block address in the processing queue in sequence, comprising:
      checking the oldest update record of the logical block address after the rollforward time point in the ULT;
      finding the snapshot storage unit corresponding to the oldest update record, and reading the data stored in the logical block address corresponding to the oldest update record; and
      writing back the logical block address of the target storage unit to perform the rollforward procedure, and performing the logical block addresses in the next processing queue, till all the logical block addresses in the processing queue are processed.

* * * * *